United States Patent
Desbois et al.

(10) Patent No.: US 11,964,449 B2
(45) Date of Patent: Apr. 23, 2024

(54) LAMINATES CONTAINING A METAL AND A POLYAMIDE COMPOSITION

(71) Applicant: BASF SE, Ludwigshafen am Rhein (DE)

(72) Inventors: Philippe Desbois, Ludwigshafen (DE); Josef R. Wuensch, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 777 days.

(21) Appl. No.: 16/495,171

(22) PCT Filed: Mar. 12, 2018

(86) PCT No.: PCT/EP2018/056073
§ 371 (c)(1),
(2) Date: Aug. 10, 2021

(87) PCT Pub. No.: WO2018/172123
PCT Pub. Date: Sep. 27, 2018

(65) Prior Publication Data
US 2021/0370644 A1 Dec. 2, 2021

(30) Foreign Application Priority Data

Mar. 20, 2017 (EP) ..................... 17161830

(51) Int. Cl.
| | | |
|---|---|---|
| B32B 15/088 | (2006.01) | |
| B32B 15/18 | (2006.01) | |
| B32B 15/20 | (2006.01) | |
| B32B 27/20 | (2006.01) | |
| B32B 27/34 | (2006.01) | |
| B32B 37/06 | (2006.01) | |
| B32B 37/15 | (2006.01) | |
| C08G 69/16 | (2006.01) | |
| C08G 69/28 | (2006.01) | |

(52) U.S. Cl.
CPC ............ *B32B 15/088* (2013.01); *B32B 15/18* (2013.01); *B32B 15/20* (2013.01); *B32B 27/20* (2013.01); *B32B 27/34* (2013.01); *B32B 37/06* (2013.01); *B32B 37/15* (2013.01); *C08G 69/16* (2013.01); *C08G 69/28* (2013.01); *B32B 2307/732* (2013.01)

(58) Field of Classification Search
None
See application file for complete search history.

(56) References Cited

U.S. PATENT DOCUMENTS

| | | | | |
|---|---|---|---|---|
| 3,852,226 | A * | 12/1974 | Sprauer | ............ C08G 69/36 528/324 |
| 4,601,941 | A | 7/1986 | Lutz et al. | |
| 2006/0269701 | A1* | 11/2006 | Gauriat | ............ C09J 177/02 428/416 |
| 2011/0195215 | A1* | 8/2011 | Briffaud | ............ C08G 69/04 428/36.9 |
| 2011/0200816 | A1 | 8/2011 | Mizrahi et al. | |
| 2013/0092226 | A1 | 4/2013 | Pawlik et al. | |
| 2016/0172074 | A1* | 6/2016 | Stoppelmann | ....... C09D 177/06 428/458 |
| 2017/0073470 | A1* | 3/2017 | Briffaud | .............. C08G 69/265 |
| 2018/0194897 | A1 | 7/2018 | Desbois et al. | |
| 2019/0023863 | A1 | 1/2019 | Lesser et al. | |
| 2019/0085127 | A1 | 3/2019 | Desbois et al. | |
| 2019/0202985 | A1 | 7/2019 | Desbois | |
| 2019/0382542 | A1 | 12/2019 | Desbois | |

FOREIGN PATENT DOCUMENTS

| | | | | |
|---|---|---|---|---|
| CN | 104804659 | A * | 7/2015 | ............ C08G 69/36 |
| CN | 105690916 | A | 6/2016 | |
| DE | 102011084519 | A1 | 4/2013 | |
| JP | S5268236 | | * 6/1977 | ............ C08G 59/00 |
| JP | S5268236 | A * | 6/1977 | ............ C08G 59/00 |
| JP | S5268236 | A | 6/1977 | |
| WO | 2005014278 | A1 | 2/2005 | |
| WO | WO-2006008357 | A1 * | 1/2006 | ............ B32B 27/06 |
| WO | 2008013640 | A1 | 1/2008 | |
| WO | WO-2014209590 | A1 * | 12/2014 | .......... C08K 5/0066 |
| WO | 2016150716 | A1 | 9/2016 | |
| WO | 2018033411 | A1 | 2/2018 | |
| WO | 2018041642 | A1 | 3/2018 | |

OTHER PUBLICATIONS

Nagai—JP S52-68236 A—Jap.Pat.Off D1—MT—polyamide adhesive—1977 (Year: 1977).*
Montanari—WO 2006-008357 A1—MT—polyamide multilayer structure—2006 (Year: 2006).*
Polymer Database—Nylon May 6-15, 2023 (Year: 2023).*
Polymer Database—Nylon 6-6—May 15, 2023 (Year: 2023).*
Polymer Database—Nylon 6-10—May 15, 2023 (Year: 2023).*
Polymer Database—Nylon 12—May 15, 2023 (Year: 2023).*
Zeng—CN 104804659 A—MT—copolyamide for adhering to metal—2015 (Year: 2015).*
English Translation of the International Preliminary Report on Patentability for International Patent Application No. PCT/EP2018/056073, dated Oct. 3, 2019, 7 pages.

* cited by examiner

Primary Examiner — John Vincent Lawler
(74) Attorney, Agent, or Firm — Armstrong Teasdale LLP

(57) ABSTRACT

The present invention relates to a laminate comprising at least one first layer of at least one first metal and at least one further layer of a polyamide composition (PC). The present invention further relates to a process for producing the laminate according to the invention.

15 Claims, No Drawings

LAMINATES CONTAINING A METAL AND A POLYAMIDE COMPOSITION

CROSS-REFERENCE TO RELATED APPLICATIONS

This application is a U.S. National Phase Application of International Patent Application No. PCT/EP2018/056073, filed Mar. 12, 2018, which claims the benefit of priority to EP Patent Application No. 17161830.9, filed Mar. 20, 2017, the entire contents of which are hereby incorporated by reference herein.

BACKGROUND

The present invention relates to a laminate comprising at least one first layer of at least one first metal and at least one further layer of a polyamide composition (PC). The present invention further relates to a process for producing the laminate according to the invention.

The provision of novel materials which are lighter than the hitherto employed materials, in particular for aircraft construction, automobile manufacture and boatbuilding, is an object often pursued in recent times. At the same time these novel materials shall have the same mechanical properties, in particular, strength, stiffness and stability, as the known materials or even improve upon these. The novel materials shall moreover be formable by known processes, for example by deep drawing, rolling, bending, stamping or seaming.

WO 2005/014 278 describes laminates which comprise an adherent polymer layer between two outer metal layers. This polymer layer comprises a polyamide 6, polyamide 6.6, polyamide 11, polyamide 12, polyamide 4.6, polyamide 6.10 or polyamide 6.12 and a copolymer of ethylene and an unsaturated carboxylic acid and/or a carboxylic acid derivative and a reactive copolymer.

The disadvantage of the laminates described in WO 2005/014 278 is that particularly after storage in a humid environment they retain only poor tensile strength. The polymer layer moreover often has varying adhesion properties.

US 2011/0200816 describes laminates comprising two metal layers and an interposed polymer layer. The polymer layer comprises for example a polyamide 6/66 copolymer.

DE 10 2011 084519 describes sealing layers for solar cells which comprise a first outer layer, an intermediate layer and a second outer layer. The layers may comprise polyamides such as for example polyamide 6 or polyamide 66.

The laminates described in US 2011/0200816 also exhibit only poor tensile strengths in particular after storage in a humid environment or are even destroyed to the point of being unusable by atmospheric humidity.

BRIEF DESCRIPTION

The present invention accordingly has for its object to provide a laminate and a process for the production thereof which exhibits the disadvantages of the laminates described in the prior art only to a reduced extent, if at all. In particular the laminate shall continue to exhibit a high tensile strength even after lengthy storage at relatively high atmospheric humidities.

This object is achieved by a laminate comprising at least one first layer of at least one first metal and at least one further layer of a polyamide composition (PC), wherein the polyamide composition (PC) comprises a copolyamide produced by polymerization of the components (A) caprolactam,
(B) at least one $C_4$-$C_{40}$-diacid and
(C) at least one $C_4$-$C_{20}$-diamine, wherein the copolyamide has an amide function concentration in the range from 3.5 to 7 amide groups/1000 g/mol.

The present invention further provides a laminate comprising at least one first layer of at least one first metal and at least one further layer of a polyamide composition (PC), wherein the polyamide composition (PC) comprises a copolyamide produced by polymerization of the components (A) caprolactam,
(B) at least one $C_4$-$C_{40}$-diacid and
(C) at least one $C_4$-$C_{20}$-diamine.

It has now been found that, surprisingly, the laminates according to the invention exhibit good tensile strengths both directly after their production and after lengthy storage at relatively high atmospheric humidities, for example for 14 days at 70° C. and 62% relative atmospheric humidity.

DETAILED DESCRIPTION

The present invention is more particularly elucidated hereinbelow.

According to the invention the laminate comprises at least one first layer of at least one first metal and at least one further layer of a polyamide composition (PC).

In the context of the present invention, "at least one first layer" is to be understood as meaning either precisely one first layer or two or more first layers.

In the context of the present invention "at least one first metal" is to be understood as meaning either precisely one first metal or a mixture of two or more first metals.

In the context of the present invention, "at least one further layer" is to be understood as meaning either precisely one further layer or two or more further layers.

It is preferable when the laminate further comprises at least one second layer of at least one second metal, wherein the at least one first layer of at least one first metal is joined to the at least one second layer of at least one second metal via the at least one further layer of the polyamide composition (PC). In such a laminate the at least one first layer is thus followed by at least one further layer which is in turn followed by at least one second layer.

Such a laminate which comprises at least one first layer, at least one further layer and at least one second layer is also known as a sandwich material.

The present invention accordingly also provides a laminate where the laminate further comprises at least one second layer of at least one second metal and where the at least one first layer is joined to the at least one second layer via the at least one further layer.

The at least one first metal of the at least one first layer may be identical or different to the at least one second metal of the at least one second layer. The at least one first metal of the at least one first layer is preferably identical to the at least one second metal of the at least one second layer.

The laminate comprises at least one first layer of at least one first metal. In other words the laminate comprises at least one first layer made of at least one first metal.

The at least one first layer of at least one first metal has a thickness for example in the range from 0.1 to 0.6 mm, preferably in the range from 0.15 to 0.4 mm and especially preferably in the range from 0.18 to 0.3 mm.

The present invention accordingly also provides a laminate where the at least one first layer has a thickness in the range from 0.1 to 0.6 mm.

The laminate preferably further comprises at least one second layer of at least one second metal. In other words the laminate preferably further comprises at least one second layer made of at least one second metal.

The at least one second layer of at least one second metal has a thickness for example in the range from 0.1 to 0.6 mm, preferably in the range from 0.15 to 0.4 mm and especially preferably in the range from 0.18 to 0.3 mm.

The present invention accordingly also provides a laminate where the laminate further comprises at least one second layer of at least one second metal, wherein the at least one second layer has a thickness in the range from 0.1 to 0.6 mm:

The thickness of the at least one second layer may be identical or different to the thickness of the at least one first layer. The thickness of the at least one second layer is preferably identical to the thickness of the at least one first layer.

Suitable as the at least one first metal of the at least one first layer are any metals and metal alloys known to those skilled in the art which are solid at the production temperatures and the use temperatures of the laminate. The at least one first metal of the at least one first layer is preferably selected from the group consisting of iron, aluminum, copper, nickel and magnesium and also alloys thereof. The at least one first metal is particularly preferably an alloy of iron and the at least one first metal is especially preferably steel.

The present invention accordingly also provides a laminate where the at least one first metal of the at least one first layer is selected from the group consisting of iron, aluminum, copper, nickel and magnesium and also alloys thereof.

The present invention accordingly also provides a laminate where the at least one first metal is selected from the group consisting of iron, aluminum, copper, nickel and magnesium and also alloys thereof.

Steel is known to those skilled in the art. In the context of the present invention "steel" is to be understood as meaning alloys comprising iron as the primary constituent. This corresponds to the definition of steel according to DIN EN 10020:2000-07.

The at least one first metal may be coated or uncoated. The at least one first metal is preferably coated. Suitable coatings for the at least one first metal are known per se to those skilled in the art and are for example adhesion promoter layers, paint or zinc or magnesium coatings.

The at least one metal is preferably zinc-coated. "Zinc-coated" is to be understood as meaning that the at least one first metal is coated with a further metal, in particular with zinc or alloys of zinc.

It is therefore particularly preferable when the at least one first metal is zinc-coated steel.

The zinc-coating of the at least one first metal may be carried out by methods known to those skilled in the art, for example by hot-dip zinc coating or by galvanic zinc coating.

If the at least one first metal is zinc-coated it may further comprise further coatings, for example adhesion promoter layers and/or paint. This is known to those skilled in the art.

The coating of the at least one first metal may be carried out by any methods known to those skilled in the art, for example the coating may be effected from an aqueous solution or a dispersion.

The abovedescribed elucidations and preferences for the at least one first metal of the at least one first layer apply correspondingly to the at least one second metal of the at least one second layer.

The present invention accordingly also provides a laminate where the laminate further comprises at least one second layer of at least one second metal, wherein the at least one second metal of the at least one second layer is selected from the group consisting of iron, aluminum, copper, nickel and magnesium and also alloys thereof.

The laminate comprises at least one further layer of a polyamide composition (PC). In other words this means that the at least one further layer is made of the polyamide composition (PC).

The at least one further layer of a polyamide composition (PC) has a thickness for example in the range from 0.02 to 1.5 mm, preferably in the range from 0.05 to 1 mm and especially preferably in the range from 0.1 to 0.5 mm.

The present invention accordingly also provides a laminate where the at least one further layer has a thickness in the range from 0.02 to 1.5 mm.

The present invention accordingly also provides a laminate where the at least one first layer has a thickness in the range from 0.1 mm to 0.6 mm and/or where the at least one further layer has a thickness in the range from 0.02 mm to 1.5 mm.

Polyamide Composition (PC)

According to the invention the polyamide composition (PC) comprises a copolyamide produced by polymerization of the components (A) caprolactam, (B) at least one $C_4$-$C_{40}$-diacid and (C) at least one $C_4$-$C_{20}$-diamine.

In the context of the present invention, "a copolyamide" means either precisely one copolyamide or a mixture (blend) of two or more copolyamides.

In addition, the polyamide composition (PC) may further comprise at least one further polymer.

In the context of the present invention, "at least one further polymer" means either precisely one further polymer or a mixture (blend) of two or more further polymers.

Polymers suitable as the at least one further polymer include any further polymers known to those skilled in the art. It will be appreciated that the at least one further polymer is distinct from the copolyamide.

It is preferable when the at least one further polymer is selected from the group consisting of polyethylene and copolymers of at least two monomers selected from the group consisting of ethylene, acrylic acid, maleic anhydride, isobutylene, propylene, octene, alkyl acrylate and alkyl methacrylate.

The present invention accordingly also provides a laminate where the polyamide composition (PC) further comprises at least one further polymer selected from the group consisting of polyethylene and copolymers of at least two monomers selected from the group consisting of ethylene, isobutylene, propylene, octene, alkyl acrylate, alkyl methacrylate, acrylic acid and maleic anhydride.

Alkyl acrylates are known to those skilled in the art and are also referred to as acrylic acid alkyl esters. Alkyl acrylates are formed by reaction of acrylic acid with an alkyl alcohol. The alkyl acrylate preferred according to the invention is n-butyl acrylate.

Alkyl methacrylates are likewise known to those skilled in the art and are also referred to as methacrylic acid alkyl esters. Alkyl methacrylates are formed by reaction of methacrylic acid with an alkyl alcohol. The alkyl methacrylate preferred according to the invention is methyl methacrylate.

In addition, the laminate may further comprise at least one filler.

The laminate preferably comprises the additional at least one filler in the polyamide composition (PC). The polyamide composition (PC) may thus further comprise at least one filler.

In the context of the present invention, "at least one filler" is to be understood as meaning precisely one filler or else a mixture of two or more fillers.

Suitable fillers include any fillers known to those skilled in the art which may be mixed with the copolyamide and optionally the at least one further polymer of the polyamide composition (PC).

It is preferable when the at least one filler is selected from the group consisting of inorganic fillers, organic fillers and natural fillers.

The at least one filler may be a fiber material or for example in the form of spheres. It is preferable when the at least one filler is a fiber material.

In the context of the present invention "fiber materials" is to be understood as meaning any materials comprising fibers, such as for example individual fibers, fiber bundles (rovings), nonwovens, non-crimp fabrics, wovens or knits.

For example the at least one filler is accordingly selected from the group consisting of boron fiber materials, glass fiber materials, carbon fiber materials, silica fiber materials, ceramic fiber materials, basalt fiber materials, metal fiber materials, aramid fiber materials, poly(p-phenylene-2,6-benzobisoxazole) fiber materials, polyester fiber materials, nylon fiber materials, polyethylene fiber materials, wood fiber materials, flax fiber materials, hemp fiber materials and sisal fiber materials.

It is particularly preferable when the at least one filler is selected from the group consisting of glass fiber materials, carbon fiber materials, aramid fiber materials, poly(p-phenylene-2,6-benzobisoxazole) fiber materials, boron fiber materials, metal fiber materials, and potassium titanate fiber materials. It is especially preferable when the at least one filler is a glass fiber material.

The present invention accordingly also provides a laminate where the polyamide composition (PC) further comprises at least one filler selected from the group consisting of inorganic fillers, organic fillers and natural fillers.

The polyamide composition (PC) comprises for example in the range from 30% to 99.9% by weight of the copolyamide, preferably in the range from 40% to 99.5% by weight and especially preferably in the range from 50% to 99% by weight, in each case based on the sum of the % by weight of the copolyamide, of the at least one further polymer and of the at least one filler, preferably based on the total weight of the polyamide composition (PC).

The polyamide composition (PC) comprises for example in the range from 0% to 50% by weight, preferably in the range from 5% to 40% by weight and especially preferably in the range from 10% to 30% by weight of the at least one further polymer in each case based on the sum of the % by weight of the copolyamide, of the at least one further polymer and of the at least one filler, preferably based on the total weight of the polyamide composition (PC).

The polyamide composition (PC) comprises for example in the range from 0.1% to 70% by weight of the at least one filler, preferably in the range from 0.5% to 60% by weight and especially preferably in the range from 1% to 50% by weight of the at least one filler, in each case based on the sum of the % by weight of the copolyamide, of the at least one further polymer and of the at least one filler, preferably based on the total weight of the polyamide composition (PC).

The sum of the % by weight of the copolyamide, of the at least one further polymer and of the at least one filler is typically 100% by weight.

In addition, the polyamide composition (PC) may comprise additives known to those skilled in the art. Additives which may be present in the polyamide composition (PC) are for example selected from the group consisting of stabilizers, dyes, antistats, filler oils, surface improvers, siccatives, demolding agents, release agents, antioxidants, light stabilizers, PVC stabilizers, lubricants, flame retardants, blowing agents, impact modifiers, adhesion promoters, coupling agents and nucleating agents.

The present invention accordingly also provides a laminate where the polyamide composition (PC) further comprises at least one additive selected from the group consisting of stabilizers, dyes, antistats, filler oils, surface improvers, siccatives, demolding agents, release agents, antioxidants, light stabilizers, PVC stabilizers, lubricants, flame retardants, blowing agents, impact modifiers, adhesion promoters, coupling agents and nucleating agents.

The additives are known per se to those skilled in the art. Coupling agents are also known as crosslinking agents. In the context of the present invention "adhesion promoters" is to be understood as meaning additives which further improve the adhesion of the polyamide composition (PC) of the at least one further layer to the at least one first layer and optionally to the at least one second layer.

The polyamide composition (PC) preferably has a melting enthalpy $\Delta H2_{(PC)}$ in the range from 20 to 60 J/g, preferably in the range from 25 to 55 J/g and especially preferably in the range from 30 to 50 J/g determined by differential scanning calorimetry (DSC) according to ISO 11357-4: 2014.

The present invention accordingly also provides a laminate where the polyamide composition (PC) has a melting enthalpy $\Delta H2_{(PC)}$ in the range from 20 to 60 J/g.

The melting enthalpy $\Delta H2_{(PC)}$ is a measure of crystallinity. When the polyamide composition consists of the copolyamide a crystallinity of 100% corresponds to a melting enthalpy $\Delta H2_{(PC)}$ of 230 J/g determined by differential scanning calorimetry (DSC) according to ISO 11357-4: 2014.

Copolyamide

According to the invention the copolyamide present in the polyamide composition (PC) is produced by polymerization of the components (A) caprolactam, (B) at least one $C_4$-$C_{40}$-diacid and (C) at least one $C_4$-$C_{20}$-diamine.

In the context of the present invention the terms "component (A)" and "caprolactam" are used synonymously and therefore have the same meaning.

In the context of the present invention, the terms "component (B)" and "at least one $C_4$-$C_{40}$ diacid" are likewise used synonymously and therefore have the same meaning.

In the context of the present invention, the terms "component (C)" and "at least one $C_4$-$C_{20}$ diamine" are likewise used synonymously and therefore have the same meaning.

The copolyamide may be produced by polymerization of any desired amounts of the components (A), (B) and (C).

It is preferable when the copolyamide is produced by polymerization of 20% to 80% by weight of the component (A), particularly preferably in the range from 35% to 75% by weight and especially preferably in the range from 50% to 70% by weight, in each case based on the sum of the percentages by weight of the components (A), (B) and (C).

The present invention accordingly also provides a laminate where the copolyamide is produced by polymerization of 20% to 80% by weight of the component (A) based on the sum of the % by weight of the components (A), (B) and (C).

In the polymerization the components (B) and (C) are preferably employed such they together amount to 20% to 80% by weight, preferably 25% to 65% by weight and especially preferably 30% to 50% by weight based on the sum of the percentages by weight of the components (A), (B) and (C).

The present invention accordingly also provides a laminate where the copolyamide is produced by polymerization of 20% to 80% by weight of the components (B) and (C) based on the sum of the % by weight of the components (A), (B) and (C).

It will be appreciated that the percentages by weight of the components (A), (B) and (C) are based on the percentages by weight of the components (A), (B) and (C) before the polymerization, i.e. when the components (A), (B) and (C) have not yet reacted with one another. During the polymerization of the components (A), (B) and (C), the weight ratio of components (A), (B) and (C) may change.

It is preferable when in the range from 45 to 55 mol % of the component (B) and in the range from 45 to 55 mol % of the component (C) in each case based on the sum of the mol % of the components (B) and (C) are polymerized.

It is particularly preferable when in the range from 47 to 53 mol % of the component (B) and in the range from 47 to 53 mol % of the component (C) in each case based on the sum of the mol % of the components (B) and (C) are polymerized.

It is most preferable when in the range from 49 to 51 mol % of the component (B) and in the range from 49 to 51 mol % of the component (C) in each case based on the sum of the mol % of the components (B) and (C) are polymerized.

It is thus most preferable when the components (B) and (C) are polymerized in a molar ratio to one another of 1:1.

It will be appreciated that the mol % of the components (B) and (C) are based on the mol % of the components (B) and (C) before these have reacted with one another.

During the polymerization of the components (A), (B) and (C), the molar weight ratio of components (B) and (C) to one another may change.

To produce the copolyamide a component (A1), at least one additional lactam, may be polymerized in addition to the component (A). It will be appreciated that the at least one additional lactam is distinct from caprolactam.

In the context of the present invention the terms "component (A1)" and "at least one additional lactam" are used synonymously and therefore have the same meaning.

In the context of the present invention, "at least one additional lactam" means either precisely one additional lactam or a mixture of two or more additional lactams.

Suitable additional lactams are known to those skilled in the art. Lactams having 4 to 12 carbon atoms are preferred according to the invention as the at least one additional lactam.

In the context of the present invention "lactams" are to be understood as meaning cyclic amides having preferably 4 to 12 carbon atoms, particularly preferably 5 to 8 carbon atoms, in the ring.

Suitable additional lactams are for example selected from the group consisting of 3-aminopropanolactam (propio-3-lactam; β-lactam; β-propiolactam), 4-aminobutanolactam (butyro-4-lactam; γ-lactam; γ-butyrolactam), 5-aminopentanolactam (2-piperidinone; δ-lactam; δ-valerolactam), 7-aminoheptanolactam (heptano-7-lactam; ζ-lactam; ζ-heptanolactam), 8-aminooctanolactam (octano-8-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano-11-lactam; ω-undecanolactam) and 12-aminododecanolactam (dodecano-12-lactam; ω-dodecanolactam).

It is preferable when no component (A1) is polymerized to produce the copolyamide.

According to the invention the copolyamide is produced by polymerization of the components (A), (B) and (C) and optionally (A1). The polymerization of the components (A), (B) and (C) and optionally (A1) is known to those skilled in the art. The polymerization of the component (A) and optionally (A1) with the components (B) and (C) is typically a condensation reaction. During the condensation reaction the component (A) and optionally (A1) react with the components (B) and (C). This causes amide bonds to form between the individual components. The component (A) is typically at least partially in open-chain form, i.e. in the form of the ε-aminocaproic acid, during the polymerization.

The polymerization of the components (A), (B) and (C) and optionally (A1) may be carried out in the presence of a catalyst. Suitable catalysts include any catalysts known to those skilled in the art which catalyze the polymerization of the components (A), (B) and (C) and optionally (A1). Such catalysts are known to those skilled in the art. Preferred catalysts are phosphorus compounds, for example sodium hypophosphite, phosphorous acid, triphenylphosphine or triphenyl phosphite.

The polymerization of the components (A), (B) and (C) and optionally (A1) forms the copolyamide which therefore comprises units derived from the component (A), units derived from the component (B) and units derived from the component (C) and optionally units derived from the component (A1).

The polymerization of the components (A), (B) and (C) and optionally (A1) forms the copolyamide as a copolymer. The copolymer may be a random copolymer but it may likewise be a block copolymer.

In a block copolymer, blocks of units derived from components (B) and (C) and blocks of units derived from component (A) are formed. These appear in alternating sequence.

In a random copolymer, units derived from the component (A) appear in alternating sequence with units derived from the components (B) and (C). This alternation is random. For example, two units derived from the components (B) and (C) may be followed by a unit derived from the component (A) which in turn is followed by a unit derived from the components (B) and (C) which in turn is followed by a three units derived from the component (A).

Production of the copolyamide preferably comprises the steps of:
  i) polymerization of the components (A), (B) and (C) to obtain a first copolyamide,
  ii) pelletization of the first copolyamide obtained in step i) to obtain a pelletized copolyamide,
  iii) extraction of the pelletized copolyamide obtained in step ii) with water to obtain an extracted copolyamide,
  iv) drying of the extracted copolyamide obtained in step iii) at a temperature ($T_T$) to obtain the copolyamide.

The polymerization in step i) may be carried out in any reactors known to those skilled in the art, preferably stirred tank reactors. Auxiliaries for improving reaction management that are known to those skilled in the art, for example defoamers such as polydimethylsiloxane (PDMS), may also be added.

In step ii) the first copolyamide obtained in step i) may be pelletized by any methods known to those skilled in the art, for example by strand pelletization or underwater pelletization.

The extraction in step iii) may be effected by any methods known to those skilled in the art. During the extraction in step iii) byproducts typically formed during the polymerization of the components (A), (B) and (C) in step i) are extracted from the pelletized copolyamide.

In step iv) the extracted copolyamide obtained in step iii) is dried. Processes for drying are known to those skilled in the art. According to the invention the extracted copolyamide is dried at a temperature ($T_T$). The temperature ($T_T$) is preferably above the glass transition temperature ($T_{G(C)}$) of the copolyamide and below the melting temperature ($T_{M(C)}$) of the copolyamide.

It is preferable when the temperature ($T_T$) is above 120° C. and below the melting temperature ($T_{M(C)}$) of the copolyamide.

The drying in step iv) is typically carried out over a period in the range from 1 to 100 hours, preferably in the range from 2 to 50 hours and especially preferably in the range from 3 to 40 hours.

It is thought that the drying in step iv) further increases the molecular weight of the copolyamide.

The copolyamide typically has a glass transition temperature ($T_{G(C)}$). The glass transition temperature ($T_{G(C)}$) is for example in the range from 10° C. to 90° C., preferably in the range from 20° C. to 70° C. and especially preferably in the range from 25° C. to 50° C. determined according to ISO 11357-2:2014.

The present invention accordingly also provides a laminate where the copolyamide has a glass transition temperature ($T_{G(C)}$), wherein the glass transition temperature ($T_{G(C)}$) is in the range from 10° C. to 90° C.

In the context of the present invention the glass transition temperature ($T_{G(C)}$) of the copolyamide relates to the glass transition temperature ($T_{G(C)}$) of the dry copolyamide as per ISO 11357-2:2014.

In the context of the present invention "dry" is to be understood as meaning that the copolyamide comprises less than 1% by weight, preferably less than 0.5% by weight and especially preferably less than 0.1% by weight of water based on the total weight of the copolyamide. The term "dry" is more preferably to be understood as meaning that the copolyamide comprises no water and is most preferably to be understood as meaning that the copolyamide comprises no solvent.

The copolyamide typically also has a melting temperature ($T_{M(C)}$). The melting temperature ($T_{M(C)}$) of the copolyamide is for example in the range from 180° C. to 215° C., preferably in the range from 170° C. to 210° C. and especially preferably in the range from 180° C. to 200° C. determined according to ISO 11357-3:2014.

The present invention accordingly also provides a laminate where the copolyamide has a melting temperature ($T_{M(C)}$) which is in the range from 180° C. to 215° C.

The copolyamide generally has a viscosity number ($V_{N(C)}$) in the range from 100 to 300 ml/g determined in a 0.5% by weight solution of the copolyamide in a mixture of phenol/o-dichlorobenzene in a weight ratio of 1:1.

The viscosity number ($V_{N(C)}$) of the copolyamide is preferably in the range from 160 to 290 ml/g and particularly preferably in the range from 170 to 280 ml/g determined in a 0.5% by weight solution of the copolyamide in a mixture of phenol/o-dichlorobenzene in a weight ratio of 1:1.

The copolyamide preferably has an amide function concentration in the range from 3.5 to 7 amide groups/1000 g/mol, particularly preferably in the range from 4 to 6.5 amide groups/1000 g/mol and especially preferably in the range from 4.5 to 6 amide groups/1000 g/mol.

The present invention accordingly also provides a laminate where the copolyamide has an amide function concentration in the range from 3.5 to 7 amide groups/1000 g/mol.

The amide function concentration is determined arithmetically. This comprises taking an average over the molecular weight of the individual units of the copolyamide. 1000 divided by the average molecular weight then gives the amide function concentration.

The averaged molecular weight of the individual units of polyamide 6 (PA 6) for example is 113 g/mol. The amide function concentration is then 1000/113 g/mol=8.85 amide groups/1000 g/mol.

The averaged molecular weight of the individual units of polyamide 6.36 (PA 6.36) for example is 323 g/mol. The amide function concentration is then 1000/323 g/mol=3.10 amide groups/1000 g/mol.

The averaged molecular weight of the individual units of polyamide 6/6.36 (PA 6/6.36) comprising 40% by weight of 6.36 units for example is 0.6*PA 6+0.4*PA 6.36=0.6*113 g/mol+0.4*323 g/mol=197 g/mol. The amide function concentration is then 1000/197 g/mol=5.08 amide groups/1000 g/mol.

The averaged molecular weight of polyamide 66 (PA 66) for example is 113 g/mol. This then gives an amide function concentration of 1000/g/mol=8.85 amide groups/1000 g/mol for polyamide 6/66 independently of the proportion of PA 6 and PA 66 units.

The copolyamide according to the invention further comprises after storage for 14 days at 70° C. and 62% relative atmospheric humidity a water content preferably in the range from 1.0% to 2.7% by weight, particularly preferably in the range from 1.3% to 2.5% by weight and most preferably in the range from 1.5% to 2.3% by weight in each case based on the total weight of the copolyamide after storage for 14 days at 70° C. and 62% relative atmospheric humidity.

Component (A)

According to the invention the component (A) is caprolactam. Caprolactam is known to those skilled in the art and is referred to as ε-Caprolactam, ε-Lactam, hexano-6-lactam or hexahydro-2H-azepin-2-one. Caprolactam is the cyclic amide of ε-aminocaproic acid and has CAS No. 105-60-2.

Component (B)

According to the invention, component (B) is at least one $C_4$-$C_{40}$-diacid.

In the context of the present invention, "at least one $C_4$-$C_{40}$-diacid" is to be understood as meaning either precisely one $C_4$-$C_{40}$-diacid or a mixture of two or more $C_4$-$C_{40}$-diacids.

In the context of the present invention "$C_4$-$C_{40}$-diacids" is to be understood as meaning aliphatic and/or aromatic compounds which are saturated or unsaturated and have 2 to 38 carbon atoms and two carboxyl groups (—COOH groups). The 2 to 38 carbon atoms may be in the main chain or in side chains. The $C_4$-$C_{40}$-diacids may also be branched or unbranched or cycloaliphatic.

The at least one $C_4$-$C_{40}$-diacid is for example butanedioic acid (succinic acid), pentandioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, tridecanedioic acid, tetradecanedioic acid or hexadecanedioic acid.

It is preferable when the component (B) is selected from the group consisting of hexanedioic acid, decanedioic acid and dodecanedioic acid.

It is further preferable when the component (B) is at least one $C_{32}$-$C_{40}$-diacid.

It is thus preferable when the component is selected from the group consisting of hexanedioic acid, decanedioic acid, dodecanedioic acid and $C_{32}$-$C_{40}$-dioic acids.

A "$C_{32}$-$C_{40}$-diacid" is also referred to as a "$C_{32}$-$C_{40}$-dimer acid" or as a "$C_{32}$-$C_{40}$-dimer fatty acid". In the context of the present invention the terms "$C_{32}$-$C_{40}$-diacid", "$C_{32}$-$C_{40}$-dimer acid" and "$C_{32}$-$C_{40}$-dimer fatty acid" are used synonymously and therefore have the same meaning.

$C_{32}$-$C_{40}$-dimer acids are known per se to those skilled in the art and are typically produced by dimerization of unsaturated fatty acids. This dimerization may be catalyzed by argillaceous earths for example.

Suitable unsaturated fatty acids for producing the at least one $C_{32}$-$C_{40}$-dimer acid are known to those skilled in the art and are for example unsaturated $C_{16}$-fatty acids, unsaturated $C_{18}$-fatty acids and unsaturated $C_{20}$-fatty acids.

The component (B) is thus preferably produced from unsaturated fatty acids selected from the group consisting of unsaturated $C_{16}$-fatty acids, unsaturated $C_{18}$-fatty acids and unsaturated $C_{20}$-fatty acids, wherein the unsaturated $C_{18}$-fatty acids are particularly preferred.

The present invention accordingly also provides a laminate where the component (B) is selected from unsaturated fatty acids selected from the group consisting of unsaturated $C_{16}$-fatty acids, unsaturated $C_{18}$-fatty acids and unsaturated $C_{20}$-fatty acids.

A suitable unsaturated $C_{16}$-fatty acid is palmitoleic acid ((9Z)-hexadeca-9-enoic acid) for example.

Suitable unsaturated $C_{18}$-fatty acids are for example selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid), α-linolenic acid ((9Z,12Z,15Z)-octadeca-9,12,15-trienoic acid), γ-linolenic acid ((6Z,9Z,12Z)-octadeca-6,9,12-trienoic acid), calendulic acid ((8E,10E,12Z)-octadeca-8,10,12-trienoic acid), punicic acid ((9Z,11E,13Z)-octadeca-9,11,13-trienoic acid), α-eleostearic acid ((9Z,11E,13E)-octadeca-9,11,13-trienoic acid) and β-eleostearic acid ((9E,11E,13E)-octadeca-9,11,13-trienoic acid). Particular preference is given to unsaturated $C_{18}$-fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid).

Suitable unsaturated $C_{20}$-fatty acids are for example selected from the group consisting of gadoleic acid ((9Z)-eicosa-9-enoic acid), eicosenoic acid ((11Z)-eicosa-11-enoic acid), arachidonic acid ((5Z,8Z,11Z,14Z)-eicosa-5,8,11,14-tetraenoic acid) and timnodonic acid ((5Z,8Z,11Z,14Z,17Z)-eicosa-5,8,11,14,17-pentaenoic acid).

The component (B) is especially preferably at least one $C_{36}$-dimer acid.

The at least one $C_{36}$-dimer acid is preferably produced from unsaturated $C_{18}$-fatty acids. It is particularly preferable when the the $C_{36}$-dimer acid is produced from $C_{18}$-fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid) and linoleic acid ((9Z,12Z)-octadeca-9,12-dienoic acid).

Trimer acids may be also formed during the production of the component (B) from unsaturated fatty acids and residues of unreacted unsaturated fatty acid may also remain.

The formation of trimer acids is known to those skilled in the art.

It is preferable according to the invention when component (B) comprises at most 0.5% by weight of unreacted unsaturated fatty acid and at most 0.5% by weight of trimer acid, particularly preferably at most 0.2% by weight of unreacted unsaturated fatty acid and at most 0.2% by weight of trimer acid, in each case based on the total weight of component (B).

Dimer acids (also known as dimerized fatty acids or dimer fatty acids) are to be understood as meaning generally, and especially in the context of the present invention, mixtures produced by oligomerization of unsaturated fatty acids. They are producible for example by catalytic dimerization of plant-derived unsaturated fatty acids, wherein the starting materials employed are in particular unsaturated $C_{16}$- to $C_{20}$-fatty acids. The reaction proceeds primarily by the Diels-Alder mechanism, and results, depending on the number and position of the double bonds in the fatty acids used to produce the dimer acids, in mixtures of primarily dimeric products having cycloaliphatic, linear aliphatic, branched aliphatic, and also $C_6$-aromatic hydrocarbon groups between the carboxyl groups. Depending on the mechanism and/or any subsequent hydrogenation the aliphatic radicals may be saturated or unsaturated and the fraction of aromatic groups may also vary. The radicals between the carboxylic acid groups then comprise 32 to 40 carbon atoms for example. Production preferably employs fatty acids having 18 carbon atoms so that the dimeric product has 36 carbon atoms. The radicals which join the carboxyl groups of the dimer fatty acids preferably comprise no unsaturated bonds and no aromatic hydrocarbon radicals.

In the context of the present invention production preferably employs $C_{18}$-fatty acids. It is particularly preferable to employ linolenic, linoleic and/or oleic acid.

Depending on reaction management the abovedescribed oligomerization affords mixtures which comprise primarily dimeric, but also trimeric, molecules and also monomeric molecules and other by-products. Purification by distillation is customary. Commercial dimer acids generally comprise at least 80% by weight of dimeric molecules, up to 19% by weight of trimeric molecules, and at most 1% by weight of monomeric molecules and of other by-products.

It is preferable to use dimer acids that consist to an extent of at least 90% by weight, preferably to an extent of at least 95% by weight, very particularly preferably to an extent of at least 98% by weight, of dimeric fatty acid molecules.

The proportions of monomeric, dimeric, and trimeric molecules and of other by-products in the dimer acids may be determined by gas chromatography (GC) for example. The dimer acids are converted to the corresponding methyl esters by the boron trifluoride method (cf. DIN EN ISO 5509) before GC analysis and then analyzed by GC.

It is thus a fundamental characteristic of "$C_{32}$-$C_{40}$-dimer acids" in the context of the present invention that the production thereof comprises oligomerization of unsaturated fatty acids. This oligomerization forms dimeric products primarily, i.e. preferably to an extent of at least 80% by weight, particularly preferably to an extent of at least 90%, very particularly preferably to an extent of at least 95% by weight and in particular to an extent of at least 98% by weight. The fact that the oligomerization forms predominantly dimeric products comprising precisely two fatty acid molecules justifies this designation which is in any case commonplace. An alternative expression for the relevant term "dimer acids" is thus "mixture comprising dimerized fatty acids".

The dimer acids for use are obtainable as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1012, Empol 1061, and Empol 1062 from BASF SE, and Unidyme 10 and Unidyme TI from Arizona Chemical.

Component (B) has an acid number in the range from 190 to 200 mg KOH/g for example.

Component (C)

According to the invention the component (C) is at least one $C_4$-$C_{20}$-diamine.

In the context of the present invention "at least one $C_4$-$C_{20}$-diamine" is to be understood as meaning either precisely one $C_4$-$C_{20}$-diamine or a mixture of two or more $C_4$-$C_{20}$ diamines.

It is preferable when the component (C) is at least one $C_4$-$C_{12}$-diamine.

In the context of the present invention "$C_4$-$C_{20}$-diamine" is to be understood as meaning aliphatic and/or aromatic compounds having 4 to 20 carbon atoms and two amino groups ($NH_2$ groups). The aliphatic and/or aromatic compounds may be unsubstituted or additionally at least monosubstituted. If the aliphatic and/or aromatic compounds are additionally at least monosubstituted, they may bear one, two or more substituents that do not take part in the polymerization of components (A), (B) and (C). Such substituents are for example alkyl or cycloalkyl substituents. These are known per se to those skilled in the art. The at least one $C_4$-$C_{20}$-diamine is preferably unsubstituted. The same applies to $C_4$-$C_{12}$-diamine.

Suitable components (C) are for example selected from the group consisting of 1,4-diaminobutane (butane-1,4-diamine; tetramethylenediamine; putrescine), 1,5-diaminopentane (pentamethylenediamine; pentane-1,5-diamine; cadaverine), 1,6-diaminohexane (hexamethylenediamine; hexane-1,6-diamine), 1,7-diaminoheptane, 1,8-diaminooctane, 1,9-diaminononane, 1,10-diaminodecane (decamethylenediamine), 1,11-diaminoundecane (undecamethylenediamine) and 1,12-diaminododecane (dodecamethylenediamine).

Component (C) is preferably selected from the group consisting of tetramethylenediamine, pentamethylenediamine, hexamethylenediamine, decamethylenediamine and dodecamethylenediamine.

The present invention accordingly also provides a laminate where the component (C) is selected from the group consisting of tetramethylenediamine, pentamethylenediamine, hexamethylenediamine, decamethylenediamine and dodecamethylenediamine.

Production

The laminate according to the invention may be produced by any methods known to those skilled in the art.

It is preferable when the laminate is produced in a continuous process.

The laminate according to the invention is preferably produced in a process comprising the steps of:

a) providing a film of a polyamide composition (PC) which comprises a copolyamide produced by polymerization of the components
   (A) caprolactam,
   (B) at least one $C_4$-$C_{40}$-diacid and
   (C) at least one $C_4$-$C_{20}$-diamine,
b) heating a first sheet of at least one first metal,
c) pressing the heated first sheet from step b) with the film provided in step a) to obtain the laminate.

The present invention accordingly also provides a process for producing a laminate according to the invention comprising the steps of a) providing a film of a polyamide composition (PC) which comprises a copolyamide produced by polymerization of the components
   (A) caprolactam,
   (B) at least one $C_4$-$C_{40}$-diacid and
   (C) at least one $C_4$-$C_{20}$-diamine,
b) heating a first sheet of at least one first metal,
c) pressing the heated first sheet from step b) with the film provided in step a) to obtain the laminate.

The abovedescribed elucidations and preferences for the polyamide composition (PC) of the laminate apply correspondingly to the polyamide composition (PC) in the process according to the invention. The abovedescribed elucidations and preferences for the copolyamide of the laminate apply correspondingly to the copolyamide in the process according to the invention. The abovedescribed elucidations and preferences for the at least one first metal of the laminate likewise apply correspondingly to the at least one first metal in the process according to the invention.

The laminate according to the invention is further preferably produced in a process comprising the steps of:

a) providing a film of a polyamide composition (PC) which comprises a copolyamide produced by polymerization of the components
   (A) caprolactam,
   (B) at least one $C_4$-$C_{40}$-diacid and
   (C) at least one $C_4$-$C_{20}$-diamine,
wherein the copolyamide has an amide function concentration in the range from 3.5 to 7 amide groups/1000 g/mol,
b) heating a first sheet of at least one first metal,
c) pressing the heated first sheet from step b) with the film provided in step a) to obtain the laminate.

The present invention accordingly also provides a process for producing a laminate according to the invention comprising the steps of a) providing a film of a polyamide composition (PC) which comprises a copolyamide produced by polymerization of the components
   (A) caprolactam,
   (B) at least one $C_4$-$C_{40}$-diacid and
   (C) at least one $C_4$-$C_{20}$-diamine,
wherein the copolyamide has an amide function concentration in the range from 3.5 to 7 amide groups/1000 g/mol and
b) heating a first sheet of at least one first metal,
c) pressing the heated first sheet from step b) with the film provided in step a) to obtain the laminate.

Step a) comprises providing a film of the copolyamide composition (PC). The film provided in step a) is made of the polyamide composition (PC).

Processes for providing a film of a polyamide composition (PC) are known per se to those skilled in the art. Step a) preferably comprises providing the film by an extrusion process.

The present invention accordingly also provides a process in which step a) comprises providing the film by an extrusion process.

Suitable extrusion processes for providing the film of the polyamide composition (PC) are known to those skilled in the art and include for example casting processes, calendaring processes, blowing processes or multi-blowing processes.

The film of the polyamide composition (PC) provided in step a) may have any desired thicknesses. The film of the polyamide composition (PC) provided in step a) typically has a thickness in the range from 1% to 20% greater than the at least one further layer of the laminate to be produced, preferably in the range from 2% to 15% greater than the at least one further layer of the laminate to be produced and especially preferably in the range from 4% to 10% greater than the at least one further layer of the laminate to be produced.

Step b) comprises heating a first sheet of at least one first metal. The first sheet is made of the at least one first metal. The heating of the first sheet may be effected by any method known to those skilled in the art. Step b) preferably comprises heating the first sheet by inductive means.

The present invention accordingly also provides a process in which the heating of the first sheet in step b) is effected by inductive means.

Step b) may comprise heating the first sheet to any desired temperature. Step b) preferably comprises heating the first sheet to a temperature above the melting temperature ($T_{M(C)}$) and below the decomposition temperature of the copolyamide present in the polyamide composition (PC).

Step b) preferably comprises heating the first sheet to a temperature in the range from 150° C. to 350° C., particularly preferably in the range from 210° C. to 280° C. and especially preferably in the range from 220° C. to 250° C.

The present invention therefore accordingly also provides a process in which step b) comprises heating the first sheet to a temperature in the range from 150° C. to 350° C.

Step c) comprises pressing the heated first sheet from step b) with the film provided in step a) to obtain the laminate. This joins the film to the first sheet. This may reduce the thickness of the film.

Processes for pressing in step c) the heated first sheet from step b) with the film provided in step a) are known per se to those skilled in the art.

The steps b) and c) may be performed simultaneously or consecutively. It is preferable when the steps b) and c) are performed simultaneously. In this case the first sheet is heated during pressing with the film provided in step a).

The laminate obtained in step c) is typically cooled. Cooling may be carried out by any processes known to those skilled in the art, for example by blowing compressed air onto the laminate. The laminate is preferably cooled while maintaining the pressing pressure.

In the obtained laminate the heated first sheet is the first layer of at least one first metal and the film is the at least one further layer of the polyamide composition (PC).

If the laminate is to comprise at least one second layer an additional step b1) comprising heating a second sheet of at least one second metal is performed. The abovedescribed elucidations and preferences for the heating of the first sheet in step b) apply correspondingly to the heating of the second sheet in step b1).

Step c) then comprises pressing the heated first sheet with the heated second sheet from step b1) while the film provided in step a) is disposed between the two sheets.

The process for producing the laminate according to the invention then typically comprises the steps of:

a) providing a film of a polyamide composition (PC) which comprises a copolyamide produced by polymerization of the components (A) caprolactam,
(B) at least one $C_4$-$C_{40}$-diacid and
(C) at least one $C_4$-$C_{20}$-diamine, b) heating a first sheet of at least one first metal,
b1) heating a second sheet of at least one second metal,
c) positioning the film provided in step a) between the first sheet heated in step b) and the second sheet heated in step b1) and pressing the first sheet heated in step b) and the second sheet heated in step b1) with the film provided in step a) to obtain the laminate.

The present invention accordingly also provides a process for producing a laminate according to the invention which further comprises at least one second layer of at least one second metal and where the at least one first layer is joined to the at least one second layer via the at least one further layer comprising the steps of:

a) providing a film of a polyamide composition (PC) which comprises a copolyamide produced by polymerization of the components (A) caprolactam,
(B) at least one $C_4$-$C_{40}$-diacid and
(C) at least one $C_4$-$C_{20}$-diamine, b) heating a first sheet of at least one first metal,
b1) heating a second sheet of at least one second metal,
c) positioning the film provided in step a) between the first sheet heated in step b) and the second sheet heated in step b1) and pressing the first sheet heated in step b) and the second sheet heated in step b1) with the film provided in step a) to obtain the laminate.

In addition, the present invention accordingly also provides a process for producing a laminate according to the invention which further comprises at least one second layer of at least one second metal and where the at least one first layer is joined to the at least one second layer via the at least one further layer comprising the steps of:

a) providing a film of a polyamide composition (PC) which comprises a copolyamide produced by polymerization of the components (A) caprolactam,
(B) at least one $C_4$-$C_{40}$-diacid and
(C) at least one $C_4$-$C_{20}$-diamine, wherein the copolyamide has an amide function concentration in the range from 3.5 to 7 amide groups/1000 g/mol and b) heating a first sheet of at least one first metal,
b1) heating a second sheet of at least one second metal,
c) positioning the film provided in step a) between the first sheet heated in step b) and the second sheet heated in step b1) and pressing the first sheet heated in step b) and the second sheet heated in step b1) with the film provided in step a) to obtain the laminate.

The abovedescribed elucidations and preferences for the at least one second metal of the at least one second layer apply correspondingly to the at least one second metal of the second sheet in the process.

The abovedescribed elucidations and preferences for the first sheet and the heating of the first sheet apply correspondingly to the second sheet and the heating of the second sheet.

The abovedescribed elucidations and preferences for step c) likewise apply correspondingly to step c) in which the second sheet is additionally positioned.

The present invention is more particularly elucidated hereinbelow with reference to examples without being limited thereto.

EXAMPLES

The following components were employed
Polyamide/Copolyamide
- P1: Polyamide 6 (Ultramid B27E from BASF SE); amide function concentration: 8.85/1000 g/mol
- P2: Polyamide 6.6 (Ultramid A27 from BASF SE); amide function concentration: 8.85/1000 g/mol
- P3: Polyamide 6/66/13.6 (Ultramid 1C from BASF SE); amide function concentration 9.1/1000 g/mol
- P4: Polyamide 6.36; amide function concentration: 3.10/1000 g/mol
- P5: Polyamide 6.10 (Ultramid S from BASF SE); amide function concentration: 7.09/1000 g/mol
- C1: Polyamide 6/6.36 comprising 30% by weight of polyamide 6.36 units; production as described below; amide function concentration: 5.68/1000 g/mol
- C2: Polyamide 6/6.36 comprising 40% by weight of polyamide 6.36 units; production as described below; amide function concentration: 5.08/1000 g/mol
- C3: Polyamide 6/6.6 (Ultramid C31 from BASF SE); amide function concentration: 8.85/1000 g/mol Further Polymer
- wP1: Lupolen KR1270 from BASF SE
- wP2: EP-MSA (ethylene/propylene/MSA copolymer)
- wP3: EO-MSA (ethylene/octylene/MSA copolymer)
- wP4: Lupolen KR1270 from BASF SE
- wP5: EBS (ethylene bisstereamide)

First and Second Metal
Steel: HX260LADZ100MBO sheet

Production of Polyamide 6/6.36

To produce polyamide 6/6.36 caprolactam, $C_{36}$-dimer acid (hydrogenated, Pripol 1009 from Croda), 85% by weight solution of hexamethylenediamine in water, and water were initially blanketed with nitrogen and reacted at a positive pressure and a temperature of 270° C. for seven hours before water was distilled off under vacuum for a further four hours. The obtained polyamide was discharged, extruded and pelletized and subsequently extracted with hot water and finally dried. The starting compounds are employed in amounts such that the obtained polyamide comprised 30% by weight or 40% by weight of polyamide 6/6.36 units.

Production of the Polyamide Composition

In a Haake CTW100 extruder the polymers reported in table 1 were compounded in the amounts reported in table 1 at 250° C. and extruded at a throughput of 2 kg per hour through a round die having a diameter of 3 mm to obtain the polyamide composition in pelletized form. The amounts reported in table 1 are all in % by weight.

Production of the Films of the Polyamide Composition

To produce the films of the polyamide composition the pelletized polyamide composition obtained as described hereinabove was extruded through a slot die having a width of 100 mm at 215° C. to 235° C. at a throughput of 0.5 to 1.0 kg/h in a Haake CTW100 extruder to obtain films of the polyamide composition having a thickness of 200 μm.

Production of Laminates

Before production both the films of the polyamide composition and also the first sheet and the second sheet of the steel were stored at 80° C. for 7 days. Both the films and the steel were cleaned with n-heptane in the region of the adherend surfaces before the production of laminates.

To produce the laminate a first sheet of the steel and a second sheet of the steel were placed into an apparatus. A film of the polyamide composition was placed between the first sheet and the second sheet. The sheets are pressed together with a clamping force of 6 kg to achieve a thickness of the film of 0.1 mm after heating.

The first and the second sheet were each heated to a temperature of 240° C. within 3 s by inductive heating during pressing and held at this temperature for a further 7 seconds to obtain the laminate. The laminate was subsequently cooled with compressed air for 20 seconds and the pressing force was then released during further cooling to room temperature.

The obtained laminates were subjected to the following tensile shear testing according to DIN 1465 directly after production and after storage for 14 days at 70° C. and 62% relative humidity; five samples were tested in each case:

i) Storage of the samples for 1 hour at room temperature (25° C.)

ii) Clamping in an Instron 10 KN/Instron 150 KN tester with specimen protect and application of tensile force until breakage at a rate of 10 mm/min. The maximum force is used to determine the tensile shear force in respect of the adherend surface by methods known to those skilled in the art iii) The adherend parts are removed from the holder and the fracture pattern is documented.

The water content after storage for 14 days at 70° C. and 62% relative atmospheric humidity was determined by gravimetry.

The results of the measurements are summarized in table 2.

TABLE 1

|      | P1   | P2  | P3  | P4 | P5   | C1  | C2  | C3  | wP1 | wP2 | wP3 | wP4 | wP5 |
|------|------|-----|-----|----|------|-----|-----|-----|-----|-----|-----|-----|-----|
| PC1  | 100  |     |     |    |      |     |     |     |     |     |     |     |     |
| PC2  |      | 100 |     |    |      |     |     |     |     |     |     |     |     |
| PC3  |      |     | 100 |    |      |     |     |     |     |     |     |     |     |
| PC4  | 70   |     |     |    |      |     |     |     |     |     |     | 30  |     |
| PC5  | 87.5 |     |     |    |      |     |     |     |     | 12  |     |     | 0.5 |
| PC6  | 80   |     |     |    |      |     |     |     |     |     |     | 20  |     |
| PC7  | 90   |     | 10  |    |      |     |     |     |     |     |     |     |     |
| PC8  |      |     |     |    | 100  |     |     |     |     |     |     |     |     |
| PC9  |      |     |     |    |      |     | 100 |     |     |     |     |     |     |
| PC10 |      |     |     |    |      | 90  |     |     |     |     | 10  |     |     |
| PC11 |      |     |     |    |      |     |     | 100 |     |     |     |     |     |
| PC12 |      |     |     |    |      |     | 70  |     |     |     |     | 30  |     |
| PC13 |      |     |     |    |      | 85  |     |     |     |     |     |     |     |
| PC14 |      |     |     |    |      | 77.5|     |     |     |     |     |     |     |

TABLE 2

| Example | Polyamide composition | Water [% by wt.] | ΔH2 [J/g] | $T_m$ [°C] | Tensile strength before storage [MPa] | Tensile strength after storage [MPa] |
|---|---|---|---|---|---|---|
| C1 | PC1 | 3.32 | 73 | 219 | 6.04 | 0 |
| C2 | PC2 | | 99 | 261 | 8.8 | 0 |
| C3 | PC3 | | — | 185 | 14.2 | 7.13 |
| C4 | PC4 | 2.47 | 47.8 | | 13.66 | 0 |
| C5 | PC5 | | 45 | 220 | 7.20 | Relamination during conditioning |
| C6 | PC6 | | 38 | 220 | 7.01 | Relamination during conditioning |
| C7 | PC7 | | 63 | 222 | 6.70 | 9.25 |
| E8 | PC8 | | 47 | 191/200 | 9.1 | 6.05 |
| E9 | PC9 | | 37 | 180 | 14.15 | 10.9 |
| E10 | PC10 | | 28 | 198.5 | 9.36 | 6.13 |
| C11 | PC11 | | 50 | 182/195 | 9.43 | |
| C12 | PC12 | 2.70 | 26 | 197 | 4.9 | Relamination during conditioning |
| E13 | PC13 | | 29 | 199 | 13.8 | 9.58 |
| E14 | PC14 | | 25.5 | 198 | 12.6 | 6.11 |

The invention claimed is:

1. A laminate comprising at least one first layer of at least one first metal and at least one further layer of a polyamide composition (PC), wherein the polyamide composition (PC) comprises a copolyamide produced by polymerization of the following components:
   (A) caprolactam,
   (B) at least one $C_{12}$-$C_{40}$-diacid, and
   (C) at least one $C_4$-$C_{20}$-diamine,
   wherein the copolyamide has an amide function concentration in a range from 3.5 to 7 amide groups/1000 g/mol; and
   wherein the polyamide composition (PC) further comprises at least one further polymer selected from the group consisting of polyethylene and copolymers of at least two monomers selected from the group consisting of ethylene, isobutylene, propylene, octene, alkyl acrylate, alkyl methacrylate, acrylic acid, and maleic anhydride.

2. The laminate according to claim 1, wherein the laminate further comprises at least one second layer of at least one second metal, and wherein the at least one first layer is joined to the at least one second layer via the at least one further layer.

3. The laminate according to claim 1, wherein the copolyamide is produced by polymerization of 20% to 80% by weight of the component (A) based on a sum of a percentage by weight of the components (A), (B), and (C).

4. The laminate according to claim 1, wherein the polyamide composition (PC) has a melting enthalpy $\Delta H2_{(PC)}$ in a range from 20 to 60 J/g.

5. The laminate according to claim 1, wherein the copolyamide has a melting temperature ($T_{M(C)}$) in a range from 180° C. to 215° C.

6. The laminate according to claim 1, wherein the copolyamide has an amide function concentration in the range from 4 to 6.5 amide groups/1000 g/mol.

7. The laminate according to claim 1, wherein the polyamide composition (PC) further comprises at least one filler selected from the group consisting of inorganic fillers, organic fillers, and natural fillers.

8. The laminate according to claim 1, wherein the at least one first metal is selected from the group consisting of iron, aluminum, copper, nickel, and magnesium and alloys thereof.

9. The laminate according to claim 1, wherein the at least one first layer has a thickness in a range from 0.1 mm to 0.6 mm and/or wherein the at least one further layer has a thickness in a range from 0.02 mm to 1.5 mm.

10. The laminate according to claim 1, wherein the polyamide composition (PC) further comprises at least one additive selected from the group consisting of stabilizers, dyes, antistats, filler oils, surface improvers, siccatives, demolding agents, release agents, antioxidants, light stabilizers, PVC stabilizers, lubricants, flame retardants, blowing agents, impact modifiers, adhesion promoters, coupling agents, and nucleating agents.

11. The laminate according to claim 1, wherein the at least one $C_{12}$-$C_{40}$-diacid, comprises at least one $C_{32}$-$C_{40}$-diacid.

12. A process for producing a laminate as claimed in claim 1, the process comprising the steps of:
   a) providing a film of a polyamide composition (PC) the comprises a copolyamide produced by polymerization of the following components:
      (A) caprolactam,
      (B) at least one $C_{12}$-$C_{40}$-diacid, and
      (C) at least one $C_4$-$C_{20}$-diamine,
      wherein the copolyamide has an amide function concentration in a range from 3.5 to 7 amide groups/1000 g/mol,
   b) heating a first sheet of at least one first metal,
   c) pressing the heated first sheet from step b) with the film provided in step a) to obtain the laminate,
   wherein the polyamide composition (PC) further comprises at least one further polymer selected from the group consisting of polyethylene and copolymers of at least two monomers selected from the group consisting of ethylene, isobutylene, propylene, octene, alkyl acrylate, alkyl methacrylate, acrylic acid, and maleic anhydride.

13. The process according to claim 12, wherein step b) comprises heating the first sheet to a temperature in a range from 150° C. to 350° C.

14. The process according to claim 12, wherein the heating of the first sheet in step b) is effected by inductive means.

15. The process according to claim 12, wherein step a) comprises providing the film by an extrusion process.

* * * * *